US009715458B2

(12) United States Patent
Koehler et al.

(10) Patent No.: US 9,715,458 B2
(45) Date of Patent: Jul. 25, 2017

(54) MULTIPROCESSOR COMPUTER SYSTEM

(71) Applicant: INTERNATIONAL BUSINESS MACHINES CORPORATION, Armonk, NY (US)

(72) Inventors: Thomas Koehler, Boeblingen (DE); Frank Lehnert, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 14/813,603

(22) Filed: Jul. 30, 2015

(65) Prior Publication Data
US 2016/0048453 A1    Feb. 18, 2016

(30) Foreign Application Priority Data
Aug. 14, 2014  (GB) .................................. 1414429.9

(51) Int. Cl.
G06F 12/10    (2016.01)
G06F 12/12    (2016.01)
(Continued)

(52) U.S. Cl.
CPC ........ *G06F 12/1027* (2013.01); *G06F 12/126* (2013.01); *G06F 2212/1016* (2013.01); *G06F 2212/681* (2013.01)

(58) Field of Classification Search
CPC .............. G06F 12/1027; G06F 12/126; G06F 2212/1016; G06F 2212/681; G06F 2212/683
See application file for complete search history.

(56) References Cited

U.S. PATENT DOCUMENTS 6,212,613 B1 *  4/2001  Belair ................. G06F 12/1027
                                                   711/207
6,480,950 B1 * 11/2002  Lyubashevskiy ... G06F 12/1027
                                                   711/202
(Continued)

FOREIGN PATENT DOCUMENTS

EP            1262876 B1     2/2012

OTHER PUBLICATIONS

Search Report for GB1414429.9 dated Feb. 10, 2015, pp. 1-3.
(Continued)

*Primary Examiner* — Edward Dudek, Jr.
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

A computer system has physical processors supporting virtual addressing. Virtual processors represent multiple execution threads, and logical state of all threads of a virtual processor is stored in a state descriptor field in main memory when the virtual processor is removed from one of the physical processors. Each thread has assigned a thread identifier, which is unique in the respective virtual processor only, and each virtual processor has assigned a unique state descriptor identifier. Address translations for the threads of the multiple virtual processors under their respective thread identifier and state descriptor identifier are stored, and a sequence number is generated when an entry in the translation lookaside buffer is created. The sequence number is stored together with a respective thread identifier, state descriptor identifier, and a valid bit in a respective translation lookaside buffer entry. A determination is made as to whether an address translation is stored in the translation lookaside buffer for a current thread identifier and a current state descriptor identifier by comparing the translation (Continued)

lookaside buffer entries with the entries in the state descriptor/thread array.

20 Claims, 3 Drawing Sheets

(51) Int. Cl.
*G06F 12/1027* (2016.01)
*G06F 12/126* (2016.01)

(56) References Cited

U.S. PATENT DOCUMENTS

| | | | |
|---|---|---|---|
| 7,716,673 | B2 | 5/2010 | Chauvel et al. |
| 8,140,834 | B2 | 3/2012 | Heller et al. |
| 2002/0069327 | A1* | 6/2002 | Chauvel ................. G06F 1/206 711/130 |
| 2002/0156989 | A1* | 10/2002 | Gaertner ............ G06F 12/1027 711/207 |
| 2010/0318763 | A1 | 12/2010 | Singh et al. |
| 2013/0262816 | A1 | 10/2013 | Ronen et al. |
| 2014/0095784 | A1 | 4/2014 | Tran et al. |
| 2015/0242319 | A1* | 8/2015 | Evans ................. G06F 12/0833 711/207 |
| 2015/0356024 | A1* | 12/2015 | Loh ..................... G06F 12/1054 711/113 |

OTHER PUBLICATIONS

Melhem, R, et al., "Leveraging Sharing in Second Level Translation-Lookaside Buffers for Chip Multiprocessors," Computer Architecture Letters, vol. 11, Issue 2, Dec. 2012, pp. 49-52.

* cited by examiner

MULTIPROCESSOR COMPUTER SYSTEM

PRIOR FOREIGN APPLICATION

This application claims priority from the United Kingdom patent application number 1414429.9, filed Aug. 14, 2014, which is hereby incorporated herein by reference in its entirety.

BACKGROUND

One or more aspects of the present invention relate in general to the field of shared-memory multiprocessor computer systems, and in particular to operating a second level translation lookaside buffer in a multiprocessor computer system.

A multiprocessor computer system allows the running of simultaneously multiple virtual processors, in which each virtual processor represents multiple threads. The virtual processors are being dispatched to one of the available physical processors in a time slice mode. Whenever a virtual processor is being removed from a physical processor, in order to dispatch another one, all logical states of all threads of this virtual processor are saved and retained in a state descriptor field residing in main memory, and the logical states of the new virtual processor to be dispatched are loaded from this processor's state descriptor field. While the logical states of each virtual processor are saved and retained in this processor's state descriptor field, address translations created by this processor's threads are stored in the second level translation lookaside buffer under this processor's state descriptor identification and under the respective thread identification.

The second level translation lookaside buffer is able to simultaneously hold address translations for a certain number of different virtual processors, each supporting a certain number of threads. The state descriptor identification and thread identification are to be kept in each second level translation lookaside buffer entry as tag information in order to correctly associate second level translation lookaside buffer entries with virtual processors and threads.

Whenever second level translation lookaside buffer entries associated with a certain state descriptor identification and thread identification are going to be invalidated in the second level translation lookaside buffer, e.g. as result of a thread executing "Purge translation lookaside buffer (TLB)" or in order to reuse a state descriptor identification and thread identification based on a least reused unit (LRU) scheme, it is necessary for state of the art implementations to inspect all second level translation lookaside buffer entries to determine whether their state descriptor identification and thread identification match the one to be invalidated, and in case it does, to turn the valid bit of the respective second level translation lookaside buffer entry off.

In U.S. Pat. No. 6,766,434 B2 "METHOD FOR SHARING A TRANSLATION LOOKASIDE BUFFER BETWEEN CPUS" by Gaertner et al., which is incorporated herein by reference in its entirety, shared-memory multiprocessor systems, such as IBM ESA/390 or RS/6000 systems, are disclosed. In a disclosed embodiment, a second-level translation lookaside buffer is shared between several central processing units. The second-level translation lookaside buffer comprises several small arrays dedicated to particular CPUs, providing an interface to a major array, which is shared between the CPUs. The dedicated arrays are required to fulfill the architected constrains and link several CPUs to the commonly used shared array.

SUMMARY

A technical problem underlying aspects of the present invention is to provide a multiprocessor computer system and a corresponding method for operating a second level translation lookaside buffer in a multiprocessor computer system, which are able to improve efficiency of usage, invalidation, replacement and sharing of entries in a second level translation lookaside buffer in a multiprocessor computer system, and to solve the above mentioned shortcomings and pain points of prior art handling of second level translation lookaside buffers in multiprocessor computer systems.

Accordingly, in one aspect of the present invention, a computer system for operating a translation lookaside buffer is provided. The computer system includes, for instance, a main memory; and physical processors to which virtual processors are dispatched in a time slice mode, wherein the computer system is configured to perform a method. The method includes, for instance, storing a logical state of threads of a virtual processor in a state descriptor field in the main memory based on the virtual processor being removed from one of the physical processors; assigning a thread identifier to each thread, which is unique in a respective virtual processor, and a state descriptor identifier unique to each virtual processor; storing address translations for the threads of the virtual processors under their respective thread identifiers and state descriptor identifiers in the translation lookaside buffer; generating a sequence number based on an entry in the translation lookaside buffer being created; storing the sequence number together with the respective thread identifier, state descriptor identifier, and a valid bit in a respective translation lookaside buffer entry, wherein the valid bit indicates whether the translation lookaside buffer entry is valid; storing for each thread identifier of each state descriptor identifier a dedicated valid bit and the sequence number in an array; and determining whether an address translation is stored in the translation lookaside buffer for a current thread identifier and a current state descriptor identifier by comparing the translation lookaside buffer entries with entries in the array.

The above, as well as additional purposes, features, and advantages of the present invention will become apparent in the following detailed written description.

BRIEF DESCRIPTION OF THE DRAWINGS

One embodiment of the present invention, as described in detail below, is shown in the drawings, in which.

DETAILED DESCRIPTION

Figure 1:
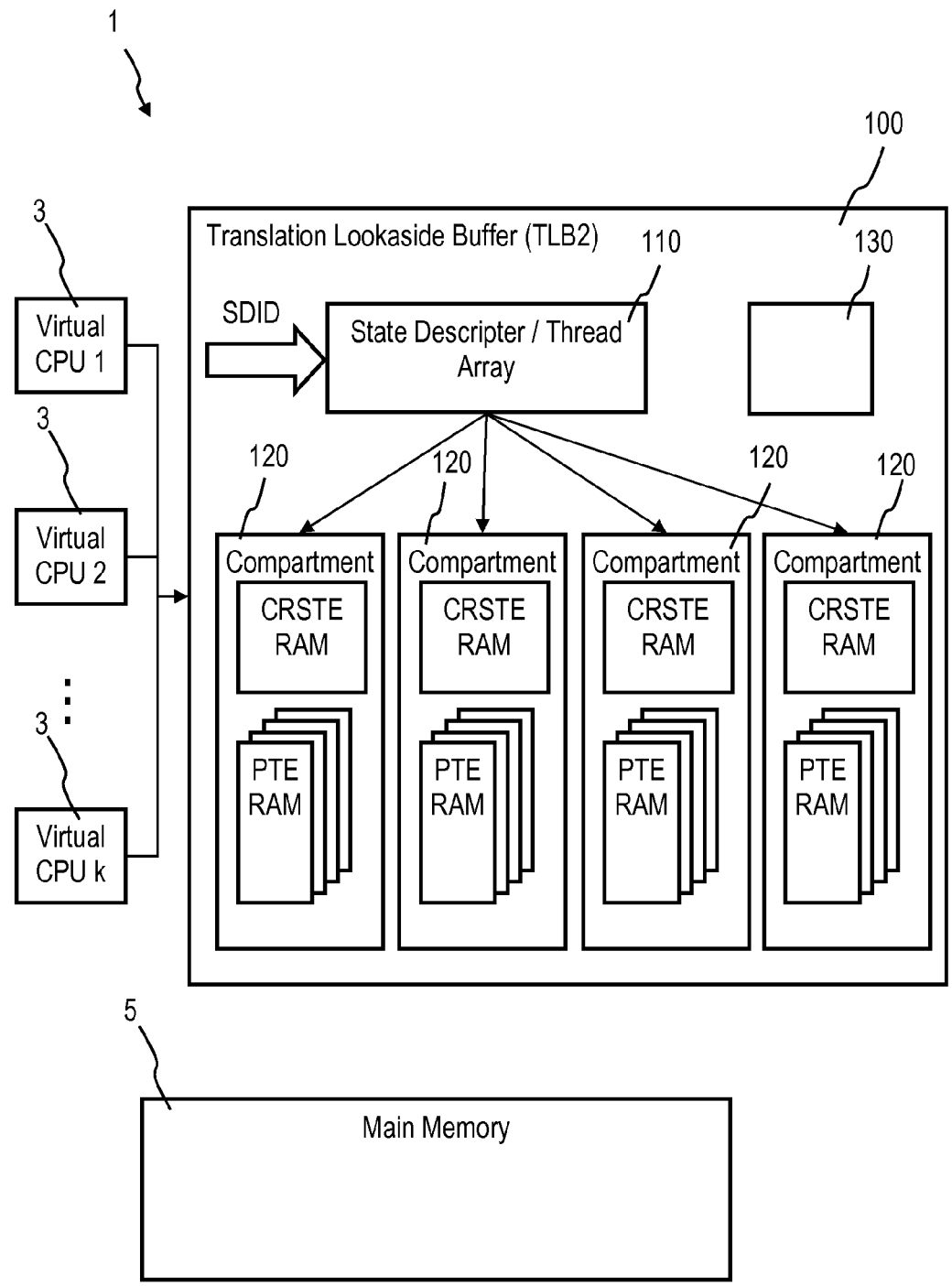
FIG. 1 is a schematic block diagram of a computer system with multiple physical processors supporting virtual addressing and sharing a main memory and a translation lookaside buffer for virtual addressing, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
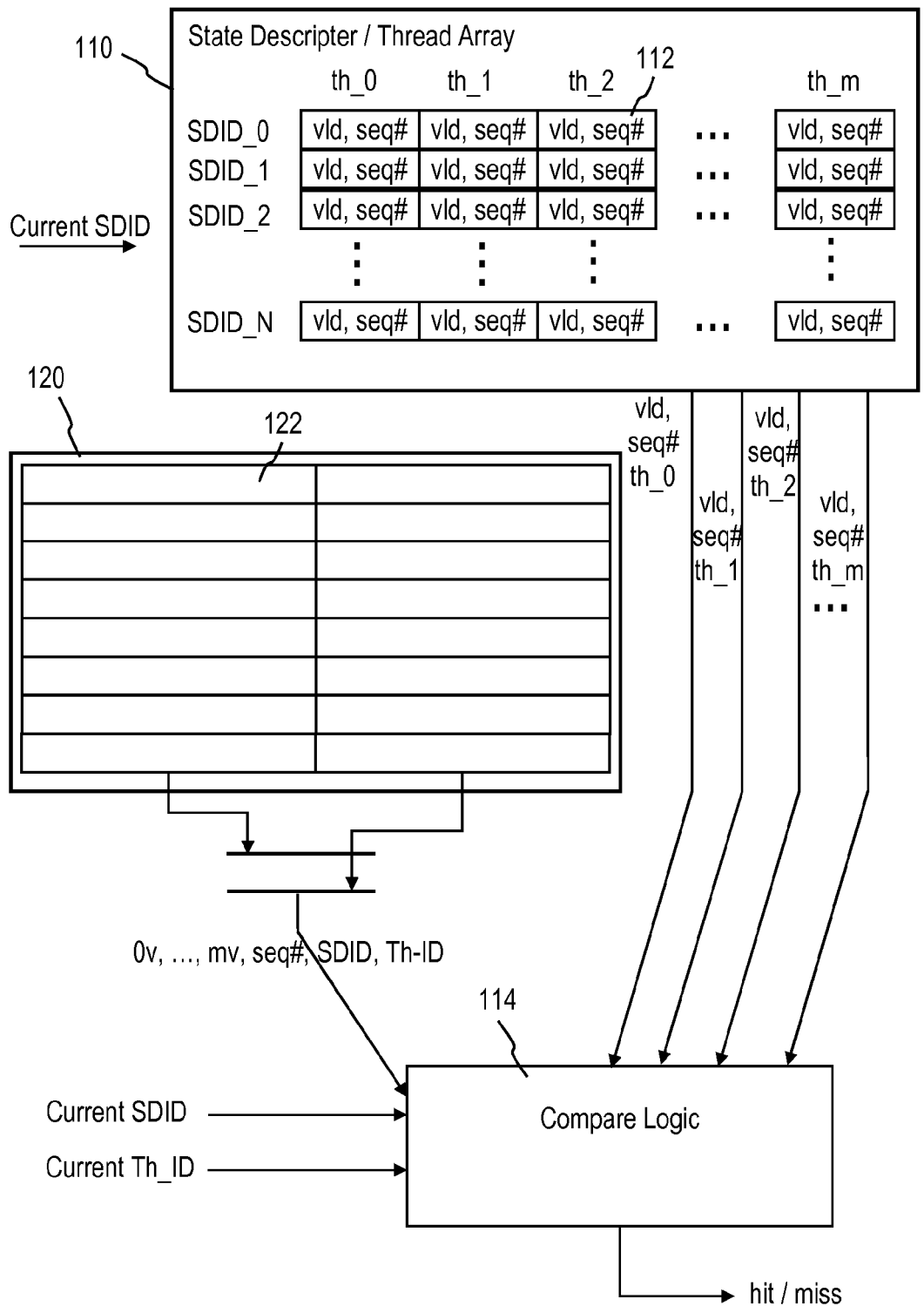
FIG. 2 is a more detailed block diagram of a second level translation lookaside buffer used in the multiprocessor computer system shown in FIG. 1, in accordance with an embodiment of the present invention.

FIG. 1 shows a computer system 1 with multiple physical processors supporting virtual addressing and sharing a main memory 5 and a second level translation lookaside buffer 100 for virtual addressing, in accordance with an embodiment of the present invention; and FIG. 2 shows further details of the second level translation lookaside buffer 100 used in the multiprocessor computer system 1 shown in FIG. 1, in accordance with an embodiment of the present invention.

Referring to FIGS. 1 and 2, the computer system 1 comprises multiple physical processors supporting virtual addressing and sharing main memory 5 and a translation lookaside buffer 100 for virtual addressing, wherein virtual processors 3 are dispatched to the physical processors in a time slice mode. The virtual processors 3 represent multiple execution threads, wherein the logical state of all threads of a virtual processor 3 is stored in a state descriptor field in the main memory 5 when the virtual processor 3 is removed from one of the physical processors. Each thread has assigned a thread identifier th_0, . . . , th_m, which is unique in the respective virtual processor 3 only, and each virtual processor 3 has assigned a unique state descriptor identifier SDID_0, . . . , SDID_N.

In the shown embodiment, the second level translation lookaside buffer 100 comprises first storing means 120 storing address translations for the threads of the multiple virtual processors 3 under their respective thread identifiers th_0, . . . , th_m and state descriptor identifiers SDID_0, . . . , SDID_N; generation means 130 generating a sequence number seq# when an entry 122 in the translation lookaside buffer 100 is created; second storing means 120 responsive to the generation means 130 storing the sequence number seq# together with a respective thread identifier th_0, . . . , th_m, state descriptor identifier SDID_0, . . . , SDID_N, and a valid bit 0v, . . . , mv in a respective translation lookaside buffer entry 122, wherein the valid bit 0v, . . . , mv indicates if the translation lookaside buffer entry 122 is valid or not; a two dimensional state descriptor/thread array 110 storing a dedicated valid bit vld and said sequence number seq# for each thread identifier th_0, . . . , th_m of each state descriptor identifier SDID_0, . . . , SDID_N; and hit compare logic means 114 to determine if an address translation is stored in the translation lookaside buffer 100 for a current thread identifier and a current state descriptor identifier by comparing the translation lookaside buffer entries 122 with the entries 112 in the state descriptor/thread array 110.

Further, the second level translation lookaside buffer 100 is hierarchically structured and comprises an upper level named as CRSTE RAM and a lower Level named as PTE RAM. This organization is in compliance with the ESA/390 and z/Series architecture, which specifies that translation lookaside buffer entries 122 may be of the type "combined region and segment-table entries" (CRSTE) or "page-table entries" (PTE). It is also in accordance with the fully hierarchical translation lookaside buffer model described in the EDAT-2 architecture. In the shown embodiment, the organization of the upper level CRSTE RAM of the second level translation lookaside buffer 100 is 256×4w (4-way set associative) for a total of 4×256=1024 entries (page-table origins), for example. In the drawings, one CRSTE column is called a compartment. Each compartment is linked to a lower level PTE RAM of the second level translation lookaside buffer 100, having a 4-way set associative organization and 256 array entry-bits for a total of 256×4=1024 entries (absolute address, etc.), and the four CRSTE compartments comprise 4×1024=4096 PTE entries. This hierarchical structure provides parallel look-up of the CRSTE RAM and PTE RAM of the second level translation lookaside buffer 100. The link between the CRSTE RAM and the PTE RAM of the second level translation lookaside buffer 100 is accomplished by storing the CRSTE index address as address tag data in the PTE RAM of the second level translation lookaside buffer 100.

One aspect of this invention is to introduce the state descriptor/thread array 110 of valid bits vld and sequence numbers seq#, so that each thread represented by a respective thread identifier th_0, . . . , th_m of each state descriptor identifier SDID_0, . . . , SDID_N has a dedicated valid bit vld and sequence number seq# assigned. Every second level translation lookaside buffer entry 122 has the sequence number seq#, under which it had been created, stored as tag information together with a valid bit $0v, \ldots, mv$ for each available thread represented by a respective thread identifier th_0, . . . , th_m and also a certain thread identification Th-ID indicating which thread has actually created this second level translation lookaside buffer entry 122. This allows a certain second level translation lookaside buffer entry 122 to be valid not only for a single thread under a given state descriptor identifier SDID_0, . . . , SDID_N, but also for any possible combination of threads.

The conception is, that any second level translation lookaside buffer entry 122 is created and owned by a certain state descriptor identifier SDID and a certain thread identifier Th-ID, but could potentially also be used by other threads under the same state descriptor identifier. In the shown embodiment, each translation lookaside buffer entry 122 keeps the certain state descriptor identifier SDID and the certain thread identifier Th-ID under which it had been created as tag information. This is an appropriate method to introduce sharing of translation lookaside buffer entries 122 among multiple threads. An actual implementation may possibly realize this concept less generally, not allowing all possible combinations of thread valid bits. For example, a single translation lookaside buffer entry 122 can have one of the following states: invalid, valid for the certain thread TH-ID, which has created the single translation lookaside buffer entry 122, or valid for all threads under the certain state descriptor identifier SDID under which the single translation lookaside buffer entry 122 was created. For such an embodiment, the per-thread valid bits $0v, \ldots, mv$ in the translation lookaside buffer entry 122 could be reduced to a single valid bit and a shared/private bit.

At second level translation lookaside buffer 100 lookup, as part of the hit compare logic 114, all valid bits vld and sequence numbers seq# of the two-dimensional state descriptor/thread array 110 are read out by means of the state descriptor identifier SDID_0, . . . , SDID_N of the currently executing thread. This information is compared against the thread valid bits $0v, \ldots, mv$, the certain state descriptor identifiers SDID, the certain thread identifiers Th-ID and the sequence numbers seq# from the entries 122 of the second level translation lookaside buffer 100. Based on this information the hit compare logic means 114 reports a translation lookaside buffer hit, when the certain state descriptor identifier SDID in a valid translation lookaside buffer entry 122 matches the current state descriptor identifier, and a sequence number seq# in the respective valid translation lookaside buffer entry 122 matches a sequence number seq# of the respective state descriptor/thread array entry 112, and a valid bit $0v, \ldots, mv$ in the respective translation lookaside buffer entry 122 corresponding to the current thread identifier is enabled. When all these conditions are true, then hit compare logic 114 reports a second level translation lookaside buffer hit, given that all other tag information like logical address (LA), address space control element (ASCE) etc. does also match.

In embodiments of the present invention, a single translation lookaside buffer entry 122 is invalid, when a valid bit $0v, \ldots, mv$ of the translation lookaside buffer entry 122 corresponding to the certain thread identifier Th-ID, under which the translation lookaside buffer entry 122 had been created and/or a valid bit vld of a respective state descriptor/thread array entry 112 corresponding to the certain thread identifier Th-ID under which it had been created is disabled, and wherein a single translation lookaside buffer entry 122 is valid, when the valid bit $0v, \ldots, mv$ of the single translation lookaside buffer entry 122 corresponding to the certain thread identifier Th-ID, under which the translation lookaside buffer entry 122 had been created and the valid bit vld of a respective state descriptor/thread array entry 112 corresponding to the certain thread identifier Th-ID under which it had been created are enabled. Therefore, it is sufficient to just turn off the valid bit vld in the two-dimensional state descriptor/thread array 110 to invalidate all second level translation lookaside buffer entries 122 for a certain state descriptor identifier SDID and a certain thread identifier Th-ID. Then, none of the second level translation lookaside buffer entries 122 valid for this certain state descriptor identifier SDID and thread identifier Th-ID can produce a hit any longer. There is no longer a need to inspect all second level translation lookaside buffer entries 122 and turn their valid bits $0v, \ldots, mv$ off at invalidation time. These entries are now logically invalid, although their valid bits $0v, \ldots, mv$ may still be on.

In order to reuse a certain state descriptor identifier SDID and/or thread identification Th-ID having been invalidated, the sequence number seq# is going to be incremented first. By this, second level translation lookaside buffer entries 122 previously associated with this state descriptor identifier SDID and/or thread identifier Th-ID under the old sequence number seq#, remain invalid, even when their valid bits 0v, . . . , mv are still on. New second level translation lookaside buffer entries 122 under this state descriptor identifier SDID and/or thread identifier Th-ID are created with the updated sequence number seq#.

When the sequence number seq# is being continuously incremented in the course of multiple purges/invalidations taking place, the sequence number seq# will wrap to 0 and at some point in time it may happen, that incrementing the sequence number seq# causes it to match an already existing second level translation lookaside buffer entry 122, potentially causing false hits on this entry 122. Therefore, second level translation lookaside buffer entries 122 are checked from time to time to identify the entries 122, which are currently not associated with an entry 112 in the two-dimensional state descriptor/thread array 110, and turn their valid bits 0v, . . . , mv off. This process takes place early enough to prevent any false association, before a second level translation lookaside buffer entry 122 has actually been invalidated.

One method to achieve this is to stop further reassignment of a certain state descriptor/thread array entry 112 including increment of the sequence number seq#, when the sequence number seq# is about to wrap from its maximum value back to zero, and to wait, until the invalidation process has walked through all second level translation lookaside buffer entries 122 looking for valid entries under this state descriptor/thread array entry 112 and turning their valid bits off.

As already mentioned, the second level translation lookaside buffer 100 holds simultaneously entries 122 for multiple virtual processors 3 with multiple threads. The virtual processors 3 and threads may belong to different virtual multiprocessor systems. Virtual processors 3 and threads from the same virtual multiprocessor system are using memory of the same relocation zone. Each relocation zone is qualified with a zone number. Invalidation operations usually only apply to entries 122 of one and the same relocation zone.

As a further enhancement, the zone number may also be stored in each two-dimensional state descriptor/thread array entry 112. This allows CAM (content-addressable memory) based invalidation schemes rapidly identifying all two-dimensional state descriptor/thread array entries 112 of a given relocation zone and turning their valid bits vld off. The CAM search could also be used to find out whether entries 122 for a given zone exist at all in second level translation lookaside buffer 100 and based on that, decide whether a certain invalidation operation may probably be skipped for this second level translation lookaside buffer 100, if it does not hold any entries for this zone.

Figure 3:
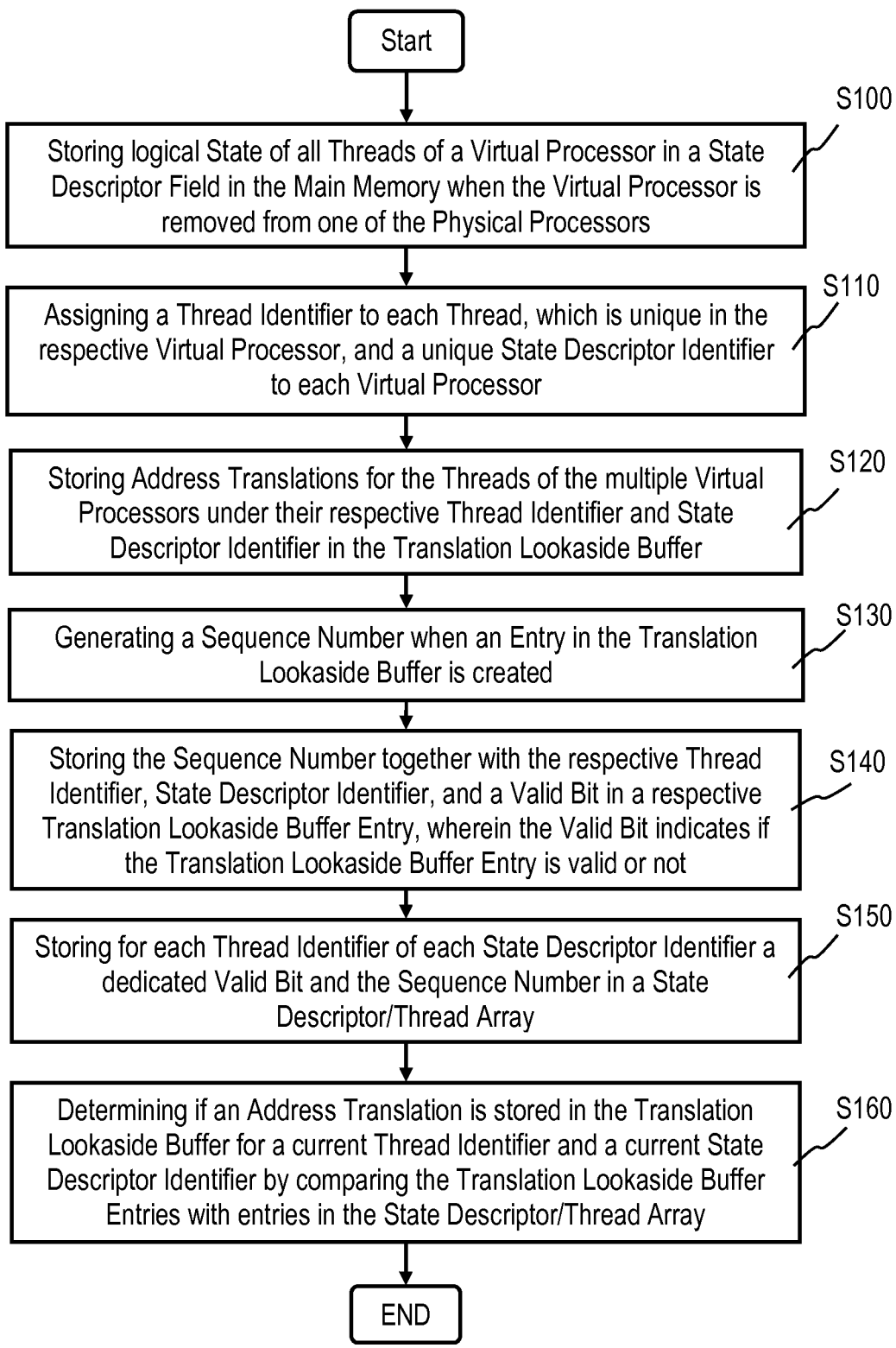
FIG. 3 is a schematic flow diagram of a method for operating a second level translation lookaside buffer in a multiprocessor computer system, in accordance with an embodiment of the present invention.

FIG. 3 shows one example of a method for operating a second level translation lookaside buffer in a multiprocessor computer system, in accordance with an embodiment of the present invention.

Referring to FIG. 3, in step S100, logical state of all threads of a virtual processor 3 are stored in a state descriptor field in the main memory 5 when the virtual processor 3 is removed from one of the physical processors. In step S110, a thread identifier th_0, . . . , th_m is assigned to each thread, which is unique in the respective virtual processor 3, and a unique state descriptor identifier SDID_0, . . . , SDID_N is assigned to each virtual processor 3. In step S120, address translations for the threads of the multiple virtual processors 3 are stored under their respective thread identifier th_0, . . . , th_m and state descriptor identifier SDID_0, . . . , SDID_N in the translation lookaside buffer 100. In step S130, a sequence number seq# is generated when an entry 122 in the translation lookaside buffer 100 is created. In step S140, the sequence number seq# is stored together with the respective thread identifier th_0, . . . , th_m, state descriptor identifier SDID_0, . . . , SDID_N, and a valid bit 0v, . . . , mv in a respective translation lookaside buffer entry 122, wherein the valid bit 0v, . . . , mv indicates if the translation lookaside buffer entry 122 is valid or not. In step S150, for each thread identifier th_0, . . . , th_m of each state descriptor identifier SDID_0, . . . , SDID_N, a dedicated valid bit vld and the sequence number seq# are stored in a state descriptor/thread array 110. In step S160, it is determined if an address translation is stored in the translation lookaside buffer 100 for a current thread identifier and a current state descriptor identifier by comparing the translation lookaside buffer entries 122 with entries 112 in the state descriptor/thread array 110.

As mentioned above a hit in the translation lookaside buffer 100 is reported, when the certain state descriptor identifier SDID in a valid translation lookaside buffer entry 122 matches the current state descriptor identifier, and a sequence number seq# in the respective valid translation lookaside buffer entry 122 matches a sequence number seq# of the respective state descriptor/thread array entry 112, and a valid bit 0v, . . . , mv in the respective translation lookaside buffer entry 122 corresponding to the current thread identifier is enabled.

As described herein, in an embodiment of the present invention, a computer system comprises multiple physical processors supporting virtual addressing and sharing main memory and a translation lookaside buffer for virtual addressing, wherein virtual processors are dispatched to the physical processors in time slice mode, and wherein the virtual processors represent multiple execution threads, wherein logical state of all threads of a virtual processor is stored in a state descriptor field in the main memory when the virtual processor is removed from one of the physical processors, wherein each thread has assigned a thread identifier, which is unique in the respective virtual processor only, and each virtual processor has assigned a unique state descriptor identifier. The translation lookaside buffer comprises first storing means storing address translations for the threads of the multiple virtual processors under their respective thread identifier and state descriptor identifier; generation means generating a sequence number when an entry in the translation lookaside buffer is created; second storing means responsive to the generation means storing the sequence number together with a respective thread identifier, state descriptor identifier, and a valid bit in a respective translation lookaside buffer entry, wherein the valid bit indicates if the translation lookaside buffer entry is valid or not; a state descriptor/thread array storing a dedicated valid bit and the sequence number for each thread identifier of each state descriptor identifier; and hit compare logic means to determine if an address translation is stored in the translation lookaside buffer for a current thread identifier and a current state descriptor identifier by comparing the translation lookaside buffer entries with the entries in the state descriptor/thread array.

In further embodiments of the present invention, a single translation lookaside buffer entry is created and owned by a certain state descriptor identifier and a certain thread identifier.

In further embodiments of the present invention, each translation lookaside buffer entry keeps the certain state descriptor identifier and the certain thread identifier under which it had been created as tag information.

In further embodiments of the present invention, each translation lookaside buffer entry keeps a sequence number under which it had been created as tag information.

In further embodiments of the present invention, each translation lookaside buffer entry keeps a valid bit for each available thread identifier as tag information.

In further embodiments of the present invention, a single translation lookaside buffer entry has one of the following states: invalid, valid for the thread, which has created the single translation lookaside buffer entry, or valid for all threads under the certain state descriptor identifier.

In further embodiments of the present invention, a single translation lookaside buffer entry is invalid, when a valid bit of the translation lookaside buffer entry corresponding to the certain thread identifier, under which the translation lookaside buffer entry had been created and/or a valid bit of a respective state descriptor/thread array entry corresponding to the certain thread identifier under which it had been created is disabled, and wherein a single translation lookaside buffer entry is valid, when the valid bit of the single translation lookaside buffer entry corresponding to the certain thread identifier, under which the translation lookaside buffer entry had been created and the valid bit of a respective state descriptor/thread array entry corresponding to the certain thread identifier under which it had been created are enabled.

In further embodiments of the present invention, the hit compare logic means reports a translation lookaside buffer hit, when the certain state descriptor identifier in a valid translation lookaside buffer entry matches the current state descriptor identifier, and a sequence number in the respective valid translation lookaside buffer entry matches a sequence number of the respective state descriptor/thread array entry, and a valid bit in the respective translation lookaside buffer entry corresponding to the current thread identifier is enabled.

In further embodiments of the present invention, a zone number is stored in each two-dimensional array entry representing a relocation zone of a corresponding shared memory.

In another embodiment of the present invention, a method for operating a second level translation lookaside buffer in a multiprocessor computer system supporting virtual addressing and sharing a main memory and the translation lookaside buffer for virtual addressing, wherein virtual processors are dispatched to the physical processors in time slice mode, and wherein the virtual processors represent multiple execution threads, comprises the steps of: storing logical state of all threads of a virtual processor in a state descriptor field in the main memory when the virtual processor is removed from one of the physical processors; assigning a thread identifier to each thread, which is unique in the respective virtual processor, and a unique state descriptor identifier to each virtual processor; storing address translations for the threads of the multiple virtual processors under their respective thread identifier and state descriptor identifier in the translation lookaside buffer; generating a sequence number when an entry in the translation lookaside buffer is created; storing the sequence number together with the respective thread identifier, state descriptor identifier, and a valid bit in a respective translation lookaside buffer entry, wherein the valid bit indicates if the translation lookaside buffer entry is valid or not, and storing for each thread identifier of each state descriptor identifier a dedicated valid bit and the sequence number in a state descriptor/thread array; and determining if an address translation is stored in the translation lookaside buffer for a current thread identifier and a current state descriptor identifier by comparing the translation lookaside buffer entries with entries in the state descriptor/thread array.

In further embodiments of the present invention, a single translation lookaside buffer entry is created and owned by a certain state descriptor identifier and a certain thread identifier; wherein each translation lookaside buffer entry keeps the certain state descriptor identifier and the certain thread identifier and a sequence number under which it had been created and valid bit for each available thread identifier as tag information.

In further embodiments of the present invention, the single translation lookaside buffer entry has one of the following states: invalid, valid for said certain thread, which has created the single translation lookaside buffer entry, or valid for all threads identified under the certain state descriptor identifier; wherein a single translation lookaside buffer entry is invalid, when a valid bit of the single translation lookaside buffer entry corresponding to the certain thread identifier, under which the translation lookaside buffer entry had been created and/or a valid bit of a respective state descriptor/thread array entry corresponding to the certain thread identifier under which it had been created is disabled, and wherein a single translation lookaside buffer entry is valid, when the valid bit of the single translation lookaside buffer entry corresponding to the certain thread identifier, under which the translation lookaside buffer entry had been created, and the valid bit of a respective state descriptor/thread array entry corresponding to the certain thread identifier under which it had been created are enabled.

In further embodiments of the present invention, a hit in the translation lookaside buffer is reported, when the certain state descriptor identifier in a valid translation lookaside buffer entry matches the current state descriptor identifier, and a sequence number in the respective valid translation lookaside buffer entry matches a sequence number of the respective state descriptor/thread array entry, and a valid bit in the respective translation lookaside buffer entry corresponding to the current thread identifier is enabled.

In another embodiment of the present invention, a data processing program for execution in a data processing system comprises software code portions for performing a method for operating a second level translation look aside buffer in a multiprocessor computer system when the program is run on the data processing system.

In yet another embodiment of the present invention, a computer program product stored on a computer-usable medium, comprises computer-readable program means for causing a computer to perform a method for operating a second level translation look aside buffer in a multiprocessor computer system when the program is run on the computer.

In summary, to improve the shortcomings and problems of prior art solutions outlined in the background section, embodiments of the present invention introduce, for example, an at least two-dimensional state descriptor/thread array of valid bits and sequence numbers, so that each thread of each virtual central processing unit has a dedicated valid bit and sequence number assigned. Every second level translation lookaside buffer entry has a sequence number, under which it had been created, stored as tag information together with a valid bit for each available thread and also a thread-identification indicating, which thread has actually created this second level translation lookaside buffer entry. This allows a certain second level translation lookaside buffer entry to be valid not only for a single thread under a given state descriptor identification, but also for any possible combination of threads.

Embodiments of the present invention employ a second level translation lookaside buffer holding address translations for multiple virtual central processing units with multiple threads with an efficient scheme to manage usage, invalidation, replacement and sharing of the second level translation lookaside buffer entries.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of aspects of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for operating a translation lookaside buffer, the computer system comprising:
   a main memory; and
   physical processors to which virtual processors are dispatched in a time slice mode, wherein the computer system is configured to perform a method, said method comprising:
      storing a logical state of threads of a virtual processor in a state descriptor field in the main memory based on the virtual processor being removed from one of the physical processors;
      assigning a thread identifier to each thread, which is unique in a respective virtual processor, and a state descriptor identifier unique to each virtual processor;
      storing address translations for the threads of the virtual processors under their respective thread identifiers and state descriptor identifiers in the translation lookaside buffer;
      generating a sequence number based on an entry in the translation lookaside buffer being created;
      storing the sequence number together with the respective thread identifier, state descriptor identifier, and a valid bit in a respective translation lookaside buffer entry, wherein the valid bit indicates whether the translation lookaside buffer entry is valid;
      storing for each thread identifier of each state descriptor identifier a dedicated valid bit and the sequence number in an array; and
      determining whether an address translation is stored in the translation lookaside buffer for a current thread identifier and a current state descriptor identifier by comparing the translation lookaside buffer entries with entries in the array.

2. The computer system according to claim 1, wherein a single translation lookaside buffer entry is created and owned by a certain state descriptor identifier and a certain thread identifier.

3. The computer system according to claim 2, wherein each translation lookaside buffer entry keeps the certain state descriptor identifier and the certain thread identifier under which it had been created as tag information.

4. The computer system according to claim 2, wherein the single translation lookaside buffer entry has one of the following states: invalid, valid for the thread which has created the single translation lookaside buffer entry, or valid for all threads under the certain state descriptor identifier.

5. The computer system according to claim 4, wherein the single translation lookaside buffer entry is invalid, based on at least one of a valid bit of the translation lookaside buffer entry corresponding to the certain thread identifier under which the translation lookaside buffer entry had been created or a valid bit of a respective array entry corresponding to the certain thread identifier under which it had been created being disabled, and wherein the single translation lookaside buffer entry is valid, based on the valid bit of the single translation lookaside buffer entry corresponding to the certain thread identifier under which the translation lookaside buffer entry had been created and the valid bit of the respective array entry corresponding to the certain thread identifier under which it had been created being enabled.

6. The computer system according to claim 5, wherein the comparing reports a translation lookaside buffer hit, based on the certain state descriptor identifier in a valid translation lookaside buffer entry matching the current state descriptor identifier, and a sequence number in the respective valid translation lookaside buffer entry matching a sequence number of the respective array entry, and a valid bit in the respective translation lookaside buffer entry corresponding to the current thread identifier being enabled.

7. The computer system according to claim 6, wherein a zone number is stored in each array entry representing a relocation zone of the main memory.

8. The computer system according to claim 1, wherein each translation lookaside buffer entry keeps a sequence number under which it had been created as tag information.

9. The computer system according to claim 1, wherein each translation lookaside buffer entry keeps a valid bit for each available thread identifier as tag information.

10. A method of operating a translation lookaside buffer in a multiprocessor computer system supporting virtual addressing and sharing a main memory, wherein virtual processors are dispatched to physical processors of the multiprocessor computer system in a time slice mode, and wherein the virtual processors represent multiple threads of execution, the method comprising:
   storing a logical state of threads of a virtual processor in a state descriptor field in the main memory based on a virtual processor being removed from one of the physical processors;
   assigning a thread identifier to each thread, which is unique in a respective virtual processor, and a state descriptor identifier unique to each virtual processor;
   storing address translations for the threads of the virtual processors under their respective thread identifiers and state descriptor identifiers in the translation lookaside buffer;

generating a sequence number based on an entry in the translation lookaside buffer being created;

storing the sequence number together with the respective thread identifier, state descriptor identifier, and a valid bit in a respective translation lookaside buffer entry, wherein the valid bit indicates whether the translation lookaside buffer entry is valid;

storing for each thread identifier of each state descriptor identifier a dedicated valid bit and the sequence number in an array; and determining whether an address translation is stored in the translation lookaside buffer for a current thread identifier and a current state descriptor identifier by comparing the translation lookaside buffer entries with entries in the array.

11. The method according to claim 10, wherein a single translation lookaside buffer entry is created and owned by a certain state descriptor identifier and a certain thread identifier, and wherein each translation lookaside buffer entry keeps the certain state descriptor identifier and the certain thread identifier and a sequence number under which it had been created and a valid bit for each available thread identifier as tag information.

12. The method according to claim 11, wherein the single translation lookaside buffer entry has one of the following states: invalid, valid for the certain thread which has created the single translation lookaside buffer entry, or valid for all thread identifiers under the certain state descriptor identifier, wherein the single translation lookaside buffer entry is invalid, based on at least one of a valid bit of the single translation lookaside buffer entry corresponding to the certain thread identifier under which the translation lookaside buffer entry had been created or a valid bit of a respective array entry corresponding to the certain thread identifier under which it had been created being disabled, and wherein the single translation lookaside buffer entry is valid, based on the valid bit of the single translation lookaside buffer entry corresponding to the certain thread identifier under which the translation lookaside buffer entry had been created, and the valid bit of a respective array entry corresponding to the certain thread identifier under which it had been created being enabled.

13. The method according to claim 12, wherein a hit in the translation lookaside buffer is reported, based on the certain state descriptor identifier in a valid translation lookaside buffer entry matching the current state descriptor identifier, and a sequence number in the respective valid translation lookaside buffer entry matching a sequence number of the respective array entry, and a valid bit in the respective translation lookaside buffer entry corresponding to the current thread identifier being enabled.

14. A computer program product for operating a translation lookaside buffer in a multiprocessor computer system supporting virtual addressing and sharing a main memory, wherein virtual processors are dispatched to physical processors of the multiprocessor computer system in a time slice mode, and wherein the virtual processors represent multiple threads of execution, the computer program product comprising:

a non-transitory computer readable storage medium readable by a processing circuit and storing instructions for execution by the processing circuit for performing a method comprising:

storing a logical state of threads of a virtual processor in a state descriptor field in the main memory based on a virtual processor being removed from one of the physical processors;

assigning a thread identifier to each thread, which is unique in a respective virtual processor, and a state descriptor identifier unique to each virtual processor;

storing address translations for the threads of the virtual processors under their respective thread identifiers and state descriptor identifiers in the translation lookaside buffer;

generating a sequence number based on an entry in the translation lookaside buffer being created;

storing the sequence number together with the respective thread identifier, state descriptor identifier, and a valid bit in a respective translation lookaside buffer entry, wherein the valid bit indicates whether the translation lookaside buffer entry is valid;

storing for each thread identifier of each state descriptor identifier a dedicated valid bit and the sequence number in an array; and determining whether an address translation is stored in the translation lookaside buffer for a current thread identifier and a current state descriptor identifier by comparing the translation lookaside buffer entries with entries in the array.

15. The computer program product according to claim 14, wherein a single translation lookaside buffer entry is created and owned by a certain state descriptor identifier and a certain thread identifier, and wherein each translation lookaside buffer entry keeps the certain state descriptor identifier and the certain thread identifier under which it had been created as tag information.

16. The computer program product according to claim 15, wherein the single translation lookaside buffer entry has one of the following states: invalid, valid for the thread which has created the single translation lookaside buffer entry, or valid for all threads under the certain state descriptor identifier.

17. The computer program product according to claim 16, wherein the single translation lookaside buffer entry is invalid, based on at least one of a valid bit of the translation lookaside buffer entry corresponding to the certain thread identifier under which the translation lookaside buffer entry had been created or a valid bit of a respective array entry corresponding to the certain thread identifier under which it had been created being disabled, and wherein the single translation lookaside buffer entry is valid, based on the valid bit of the single translation lookaside buffer entry corresponding to the certain thread identifier under which the translation lookaside buffer entry had been created and the valid bit of a respective array entry corresponding to the certain thread identifier under which it had been created being enabled.

18. The computer program product according to claim 17, wherein the comparing reports a translation lookaside buffer hit, based on the certain state descriptor identifier in a valid translation lookaside buffer entry matching the current state descriptor identifier, and a sequence number in the respective valid translation lookaside buffer entry matching a sequence number of the respective array entry, and a valid bit in the respective translation lookaside buffer entry corresponding to the current thread identifier being enabled.

19. The computer program product according to claim 14, wherein a zone number is stored in each array entry representing a relocation zone of the main memory.

20. The computer program product according to claim 14, wherein each translation lookaside buffer entry keeps a sequence number under which it had been created and a valid bit for each available thread identifier as tag information.

* * * * *